United States Patent [19]
Bachhuber et al.
[11] Patent Number: 4,825,210
[45] Date of Patent: Apr. 25, 1989

[54] ELECTRONIC LOCKING SYSTEM HAVING A LOCK AND A METHOD FOR RE-SYNCHRONIZATION

[75] Inventors: Anton Bachhuber, Nuestadt/Donau; Arnost Proske, Fuerstenfeldbruck, both of Fed. Rep. of Germany

[73] Assignee: Siemens Aktiengesellschaft, Berlin and Munich, Fed. Rep. of Germany

[21] Appl. No.: 85,075

[22] Filed: Aug. 12, 1987

[30] Foreign Application Priority Data

Aug. 12, 1986 [DE] Fed. Rep. of Germany ....... 3627291

[51] Int. Cl.[4] .............................................. G06K 7/04
[52] U.S. Cl. ......................... 340/825.31; 340/825.54; 340/825.69; 361/172; 70/256
[58] Field of Search .......................... 455/151, 92, 68; 340/825.31, 825.34, 825.69, 825.72, 825.3, 542, 520, 825.32, 825.54, 825.76, 528, 63-65; 307/10 AT, 10 R; 70/256, 257; 361/172

[56] References Cited

U.S. PATENT DOCUMENTS

| | | | |
|---|---|---|---|
| 4,509,093 | 4/1985 | Stellberger | 340/825.31 |
| 4,595,902 | 6/1986 | Proske et al. | 340/825.31 |
| 4,596,985 | 6/1986 | Bongard et al. | 340/825.31 |
| 4,631,736 | 12/1986 | Yananoue | 340/825.31 |
| 4,688,036 | 8/1987 | Hirano et al. | 340/825.31 |
| 4,737,784 | 4/1988 | Hirano | 340/825.31 |
| 4,744,021 | 5/1988 | Kristy | 340/825.31 |

*Primary Examiner*—Robert L. Griffin
*Assistant Examiner*—Curtis Kuntz
*Attorney, Agent, or Firm*—Hill, Van Santen, Steadman & Simpson

[57] ABSTRACT

An electronic locking system and method provides a control unit in a receiver to open a lock of a locking system when a transmission sequence output by a transmitter of the electronic locking system coincides with a reference sequence within a re-synchronization region in the receiver, the transmission sequence being formed by a user by repeated actuation of the transmitter and stored in a mark memory of the receiver. If necessary, the synchronization unit synchronizes the reference generator to the most recent transmission mark of the transmission sequence.

10 Claims, 4 Drawing Sheets

ELECTRONIC LOCKING SYSTEM HAVING A LOCK AND A METHOD FOR RE-SYNCHRONIZATION

BACKGROUND OF THE INVENTION

1. Field of the Invention

The present invention relates generally to an electronic locking system having a transmitter for emitting a transmission signal and a receiver for receiving the transmitted signal and comparing the received signal to a reference signal for opening the lock upon the identity of the received signal and reference signal. The invention also relates to a method for resynchronization of the transmitter and receiver of such system.

2. Description of the Related Art

In an electronic locking system having a transmitter and receiver, initialization of the system forms the basis for its operation wherein a sequence of reference marks is rigidly prescribed in a reference generator of the receiver, and a sequence of transmission marks identical to the reference marks is rigidly prescribed in a mark generator of the transmitter. After initialization, the reference generator is set to a reference mark which is identical to the transmission mark of the mark generator of the transmitter. The two sequences are thereby identified by a stored algorithm and by starting parameters which are defined by a random process.

In a transmission event, the transmitter emits a transmission signal having one of the transmission marks. For example, the transmission signal may be emitted by a light emitting diode in the infrared range. The transmission signal is converted into an electrical signal in the receiver and the receiver recovers the transmission mark from the transmission signal and compares the transmission mark in the receiver to a reference mark supplied by the reference generator. When the reference mark and the transmission mark are found to be identical and there is synchronization between the transmitter and the receiver, a control means in the receiver initiates opening of the lock. When the reference mark and the transmission mark are found not to be identical, a synchronization unit in the receiver restores synchronization between the reference generator and the mark generator under certain conditions.

A lack of identity between the reference mark and the transmission mark can, for example, occur when the transmitter outputs a transmission signal which does not reach the receiver so that the respective sequences no longer coincide. In this case, re-synchronization of the reference generator in the receiver must be undertaken to get the locking system to open the lock. Of course, lack of identity also occurs during unauthorized attempts to open the lock.

A known locking system is disclosed in European patent application No. 84 10 61 42.7, in which additional information is provided in the transmission signal for re-synchronization. The receiver derives a reference mark from the additional information to which the reference generator in the receiver should be resynchronized by the synchronization unit. The generation and evaluation of the auxiliary information requires additional equipment outlay without providing higher security.

SUMMARY OF THE INVENTION

It is an object of the present invention to reliably and simply perform re-synchronization of a transmitter and receiver in an electronic lock system when they are out of synchronization while assuring that actuation of the electronic locking system by an unauthorized person is avoided with high probability.

This and other objects of the invention are achieved in an electronic locking system having a synchronization unit with a memory in the receiver in which a transmission sequence is stored, the synchronization unit synchronizing a reference generator when a reference sequence is identical to the transmission sequence within a re-synchronization region. The objects of the invention are also achieved in a method that includes storing the transmission sequence in the receiver, and resynchronizing the receiver when a reference sequence which is identical to the transmission sequence is present within a resynchronization region.

In the present electronic locking system, the receiver has a memory, for example, an RAM, in which an excerpt from the sequence of transmission marks is stored by repeated actuation of the transmitter. This excerpt is referred to as a transmission sequence. The receiver compares the transmission sequence for identity to a reference sequence composed of successive reference marks that are supplied by a reference generator. The reference sequence lies within the re-synchronization region which extends over the excerpt from the sequence of reference marks and begins with the reference mark which is encountered by the first, desynchronized transmission mark. When the receiver recognizes identity between the transmission sequence and the reference sequence within the re-synchronization region, the synchronizing unit synchronizes the reference generator to the last transmission mark of the transmission sequence and the lock of the locking system is opened by the control unit.

A relatively short sequence of reference marks, known as a capture sequence, is also provided in a capture region at the start of the re-synchronization region. The synchronizing unit initially searches for a reference mark identical with the received transmission mark within the capture sequence. Upon finding an identical reference mark within the capture sequence, the synchronizing unit synchronizes the reference generator to the received transmission mark within an extremely short time. Only when there is no identity between the received transmission mark and one of the reference marks within the capture range, is a check undertaken to see whether a reference mark or reference sequence identical to the received transmission mark or sequence exists within the remaining portion of the re-synchronization region.

The probability that an unauthorization person has of opening the lock with a transmitter is set forth in the following example.

Assuming that a transmission mark and a corresponding reference mark are each a binary word of twenty-four bits, a maximum of $2^{24}$ different transmission marks or reference marks are provided. The probability of an unauthorized person randomly finding a synchronized transmission mark thus amounts only to $2^{-24}$, or approximately $5.96\times10^{-8}$. When a capture sequence, for example, is 100 reference marks long, the break-in probability becomes $5.96\times10^{-6}$. When the length of the re-synchronization region minus the length of the capture sequence is specified as 1000 reference marks, and when the transmission sequence is two transmission marks long, a value of $(5.96\times10^{-8})^{2\times103}=5.95\times10^{-13}$ is the break-in probability.

The break-in probability can be further reduced by varying the length of the capture region. In addition to having the user manually set the length of the capture region, a random generator, for example, can instead be provided in the synchronization unit of the receiver for this purpose. The random generator re-determines the length of the capture region after each re-synchronization.

The length of the reference sequence which the receiver checks against the received transmission sequence for resynchronization in the re-synchronization region can be automatically set by the receiver, for example, after resynchronization has been carried out.

The reliability of the present method can be enhanced by automatically re-setting the length of the re-synchronization region by the receiver after each re-synchronization is carried out. Variation of the re-synchronization region is determined either by calculations performed in the synchronizing unit or, for example, by a random generator in the synchronizing unit.

The receiver also contains a timer, in one embodiment, which inhibits the receiver for a waiting time, or delay, when a re-synchronization attempt fails. During the waiting time or delay, the receiver does not react to any transmission marks. After expiration of the waiting time, an authorized user of the locking system has the possibility of transmitting a new transmission mark to cause the locking system to open without requiring a renewed initialization of the system.

Advantageous variations of the invention are provided by including an old value memory in which a most recent old value of the reference mark is deposited. The synchronization unit sets the reference generator to the stored old value after a failed re-synchronization attempt.

A transmitter is provided for the electronic locking system which includes a trigger to initiate emission of a trigger signal. The mark generator is connected to the trigger and, upon receiving a trigger signal, generates a transmission mark according to a prescribed algorithm. A modulater is also provided for modulating a preselected signal with the transmission mark from the mark generator, and an emitter is also included over which the modulated preselected signal is output at every transmission event.

A receiver for the electronic locking system has a sensor for picking up the transmitted signals and a reference generator for supplying a sequence of reference marks and which is driven to produce a new reference mark from the sequence by each and every received transmission signal. A synchronization unit following the transmission signal compares the received transmission mark to the reference mark supplied by the reference generator and, when lacking identity therebetween, restores the synchronization of the transmitter and receiver when the transmission mark and reference mark lie within a resynchronization region which extends over an excerpt of the sequence of reference marks. When the marks are found to be identical and the lock system is synchronized, a control unit opens the lock.

The device and method of the present invention are particularly useful in a lock system of a motor vehicle.

BRIEF DESCRIPTION OF THE DRAWINGS

FIG. 3B is a bit diagram for the transmission or reference mark indicating the bit places considered in the algorithm of FIG. 3A.

DESCRIPTION OF THE PREFERRED EMBODIMENTS

Figure 1:
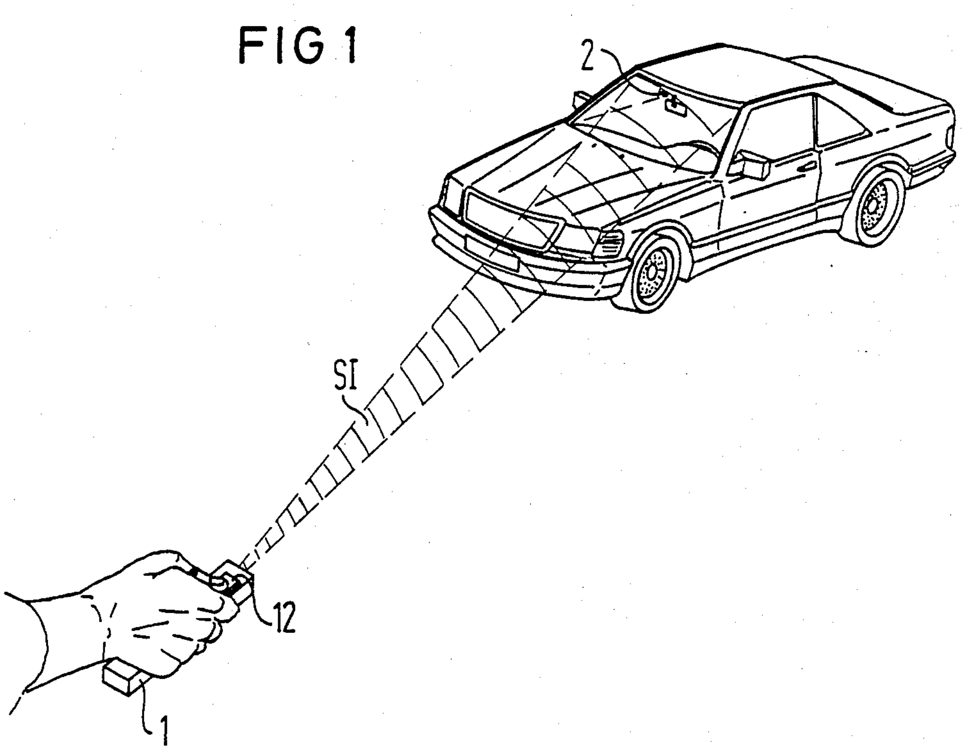
FIG. 1 is a perspective view of a transmitter and receiver of the present invention, the receiver being mounted in a motor vehicle.
Figure 2:
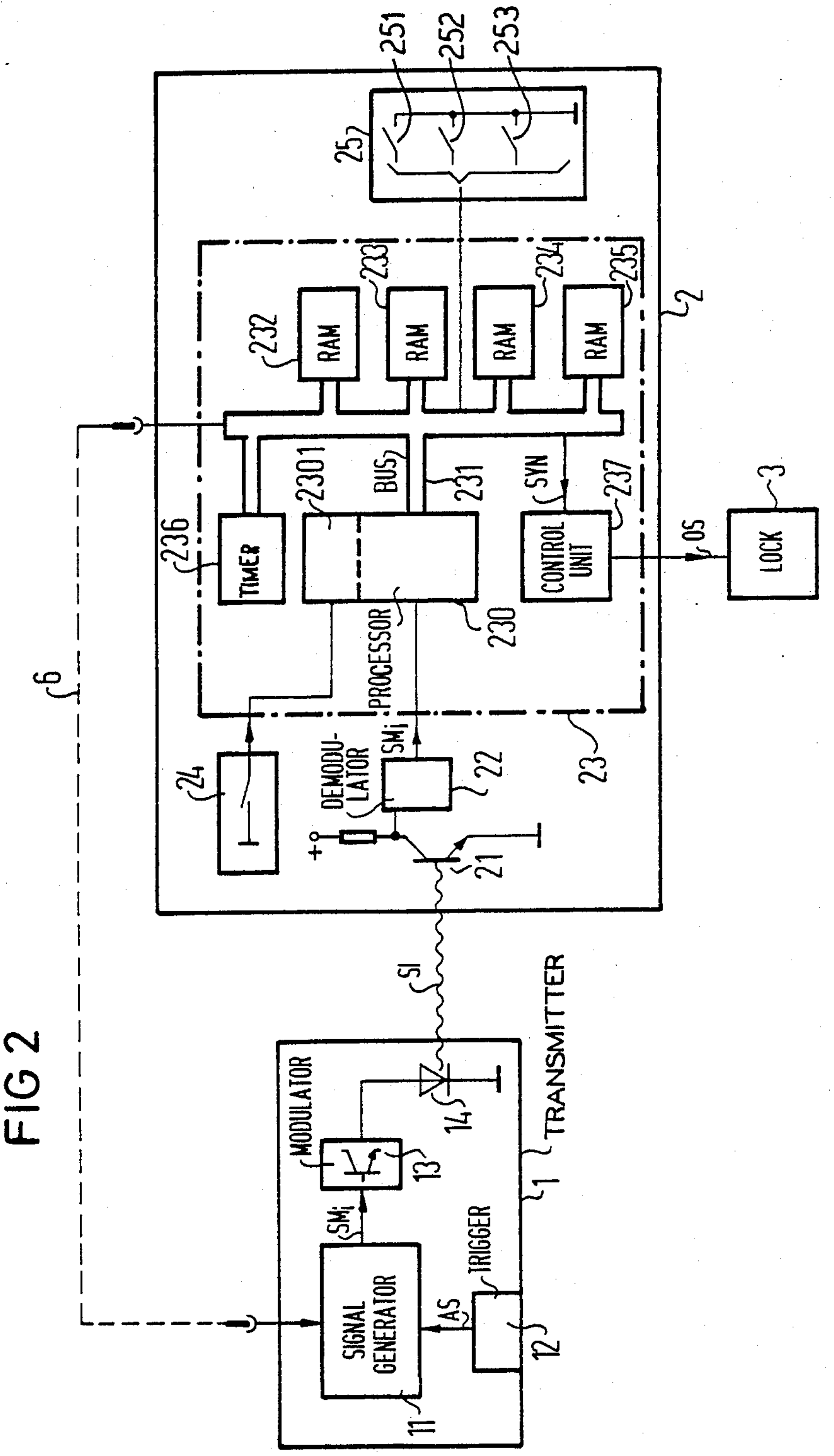
FIG. 2 is a functional block diagram of an exemplary embodiment of a transmitter and receiver according to the principles of the present invention.

In FIG. 1 and in the block diagram of FIG. 2, a locking system for a motor vehicle or the like includes a transmitter 1 and a receiver 2 which is connected to a lock 3 of the motor vehicle and which is accommodated within the motor vehicle in the proximity of a rearview mirror. The transmitter 1 has a trigger 12, for example, a key or button, which, upon manual actuation, emits a trigger signal AS to a signal generator or mark generator 11 connected to the trigger 12. The signal generator 11, when excited by the trigger signal AS, generates a current transmission mark $SM_i$ per each trigger actuation by means of an algorithm (shown in FIG. 3). The current transmission mark $SM_i$ is preferably composed of a binary word having 24 places or bits. A low power consumption CMOS single-chip microprocessor is utilized as the signal generator 11 to output the transmission mark $SM_i$ to a modulator 13 which includes a drive transistor. The modulator 13 sends current through a light emitting diode 14 in synchronization with the binary signal so that the light emitting diode 14 emits a transmission signal SI on which the transmission mark $SM_i$ is modulated. The light emitting diode 14 preferably operates in the infrared range. Other types of transmitters, such as radio frequency transmitters, are also contemplated for use with the present invention.

The transmitter 1 is shown being operated to emit the transmission signal SI toward the receiver 2 in the motor vehicle. The receiver 2 includes a phototransistor 21 at its reception stage which, upon reception of the transmission signal SI, forwards a signal corresponding thereto to a demodulator 22. The demodulator 22 retrieves the pulses corresponding to the transmission mark $SM_i$ and emits them over an output to a microcomputer 23, where they are further processed. The microcomputer 23 essentially contains a microprocessor 230 which acts as a synchronization unit by including an appropriate program. Connected to the microprocessor 230 by a bus 231 are four memory units 232, 233, 234 and 235, a timer 236, a control unit 237, a start switch 24, and an input switch 25. The memories 232–235 are preferably RAM memories.

The processor 230 deposits successively arriving transmission marks SM of a transmission sequence SF into the memory unit 232, which is referred to as a mark memory. The memory unit 233 is controlled by the processor 230 to serve as a reference generator. The memory 233 contains an old value $BM_o$ and a new value $BM_i$ of the reference mark BM in alternating succession. The new value $(BM_i)_x$ is generated from the old value $(BM_o)_{x-1}$ according to an algorithm (illustrated in FIG.

3). In other words, the algorithm of FIG. 3 provides for generation of both the transmission marks in the transmitter 1 and the reference marks in the receiver 2. The new value $(BM_i)_x$ is generated after reception of a transmission mark by the receiver 2. During initialization, the new value $(BM_i)_x$ is generated with the assistance of a random generator 2301 contained within the microprocessor 230, or is supplied from the memory unit 234 after a failed re-synchronization. The memory unit 234 is an old value memory. In synchronized normal operation and during attempted re-synchronization, the most recent new value $(BM_i)_{x-1}$ serves as an old value $(BM_o)_{x-1}$ for calculating the next new value $(BM_o)_{x-x}$.

The receiver 2 has the input switch 25 which includes three individual switches that are connected to the bus 231. The length of the capture region FB is set with a capture sequence switch 251; the length of a reference sequence is set with a reference sequence switch 252; and the length of the resynchronization region MB is set with a region length switch 253.

To initialize the locking system, the microcomputer 23 in the receiver 2 is connected to the transmitter 1 with a plugable cable 6 having, for example, plugs on each end. Subsequently, the starting switch or trigger 24 is manually actuated for an arbitrary time duration which the random signal generator 2301 measures by incrementing. After being enabled by the starting switch 24, the processor 230 supplies a random binary word of, for example, six bytes in length whose value depends on the actuation time of the starting switch 24. The first three bytes of the random word form an old value for the reference mark BM and are stored in the reference generator 233. The last three bytes form a sub-word HAZ which is stored in the memory unit 235, also known as the random memory. The random word made up of the old value of the reference mark and the sub-word HAZ formed during initialization is simultaneously loaded through the cable 6 into the mark generator 11 of the transmitter 1. Every transmission signal SI output by the transmitter 1 therefore has a transmission mark $SM_i$ which is determined by the starting parameter and by an algorithm which is identical in each of the transmitter 1 and receiver 2.

In the receiver 2, every transmission mark $SM_i$ of the transmission signal SI is deposited into the mark memory 232 by the microcomputer 23. The capacity of the mark memory 232 is such that all transmission marks SM of the transmission sequence SF can be accommodated.

A new value of the reference mark $(BM_i)_x$ is formed upon the reception of the first transmission mark $SM_i$ by the receiver 2 following the initialization, or in other words, following the aforementioned starting parameters. The new value of the reference mark $BM_i$ is generated by an algorithm in the transmitter 1. As long as every transmission mark $SM_i$ output by the transmitter 1 also reaches the receiver 2, the transmission mark $SM_i$ and new value of the reference mark $BM_i$ are identical. When the microcomputer 23 recognizes this identity, it produces an opening signal OS which is transmitted to the lock 3 through a control unit 237.

Figure 3A:
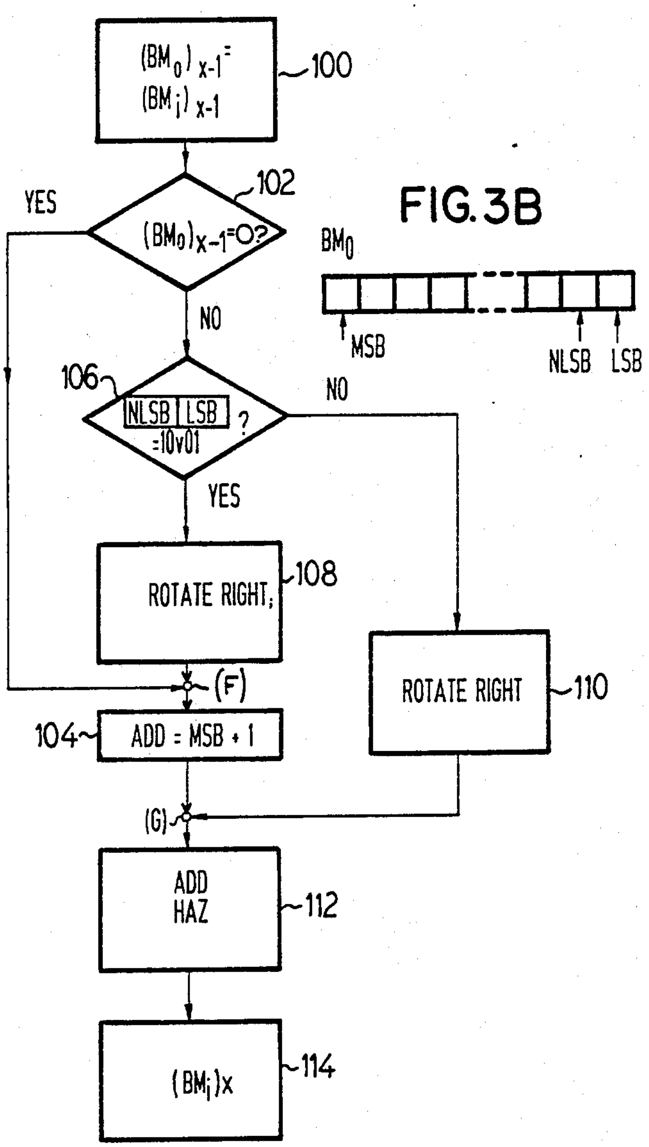
FIG. 3A is a flow chart showing an algorithm for generating a transmission or reference mark.

The algorithm for generating the new value $BM_i$ of the reference mark from the old value $BM_o$ with the assistance of the computer 23 shall be explained hereinafter with reference to FIG. 3A. After receipt of a transmission mark $SM_x$ at block 100, the computer 23 first checks to see whether the most recent old value $(BM_o)_{x-1}$ of the reference mark has the value O or not at block 102. When the value of $(BM_o)_{x-1})$ is equal to O, the first place (MSB) of the contents of the reference generator 233 has a logic 1 added to it at block 104 (point G in FIG. 3). For the position of the bit places, see FIG. 3B. When, by contrast, $(BM_o)_{x-1}$ is not equal to zero, the computer 23 checks whether the penultimate place NLSB (next least significant bit) and the last place LSB (least significant bit) of $(BM_o)_{x-1}$ together yield either the binary number 10 or the number 01 at block 106. When one of these numbers is present, the content of the reference generator 233 is shifted one place to the right at block 108 and a 1 is added to the first place MSB (most significant bit) at the block 104 (point G in FIG. 3). When the binary numbers 10 or 01 are not present, the memory content of 233 is only shifted one place toward the right at block 110. The sub-word HAZ from the random memory 235 is now added to the content of the reference generator 233 at block 112. The new value $(BM_i)_x$ of the reference mark is thus present in the reference generator 233 at block 114.

Figure 4:
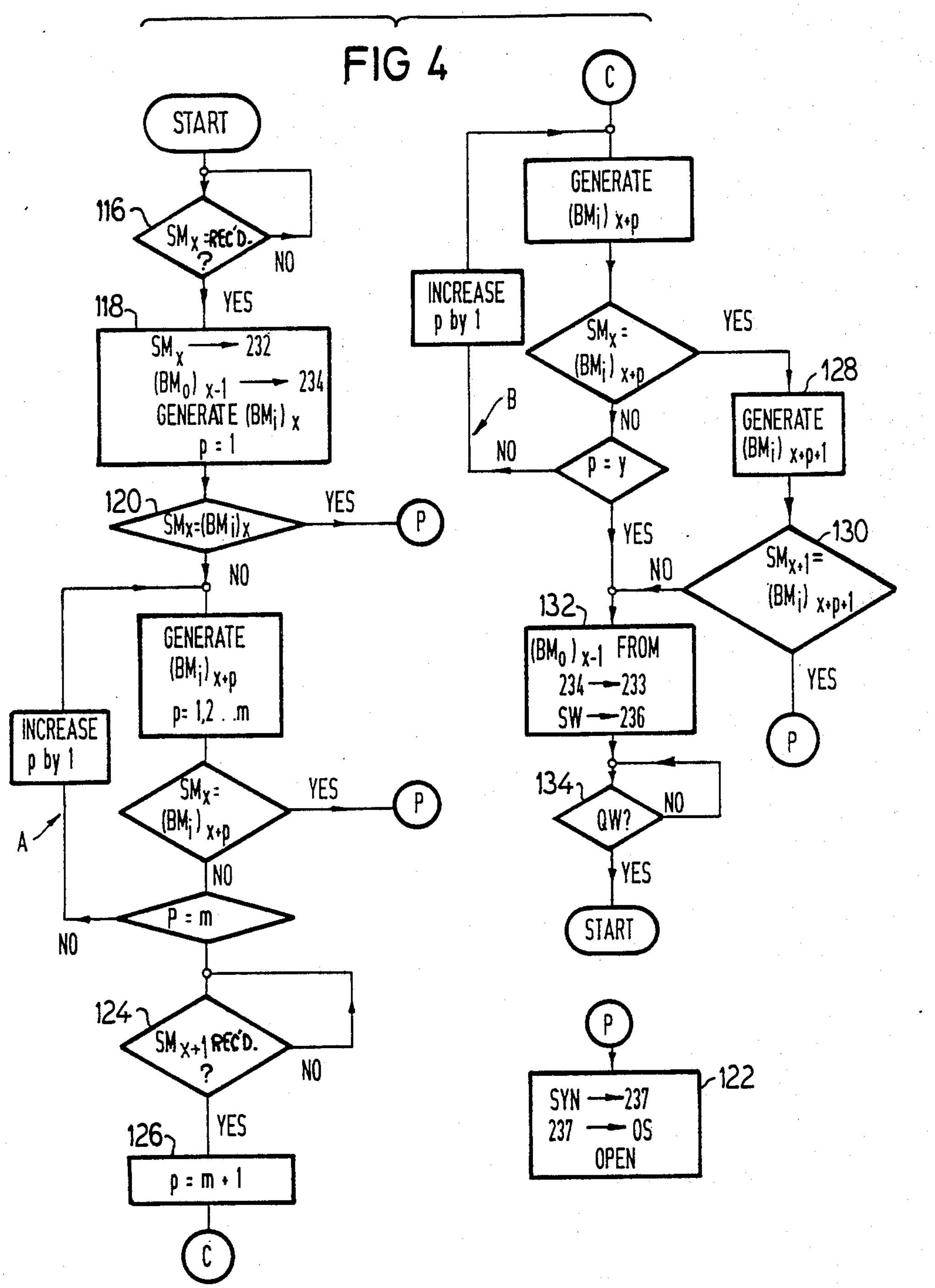
FIG. 4 is a flow chart showing an evaluation of transmission marks in the receiver of FIG. 2.

In FIG. 4, the program steps for interpreting the transmission marks $SM_x$ in the receiver 2 are shown. It is assumed that a transmission sequence SF is two transmission marks SM long and that a reference sequence BF is two reference marks BM long. The corresponding switches of the input switch 25 are thus set to the value 2.

Upon the reception of the first transmission mark $SM_x$ at block 116, this first transmission mark $SM_x$ is deposited into the mark memory 232 and the old value $(BM_o)_{x-1}$ is deposited into the old value unit 234 at block 118. Following thereupon, the processor 230 initiates the generation of the new value $(BM_i)_x$ of the reference mark according to the algorithm of FIG. 3, and deposits it in the reference generation 233. Finally, the processor 230 compares this new value $(BM_i)_x$ to the transmission mark $SM_x$ for identity at block 120.

When identity is established, the transmitter 1 and receiver 2 being synchronized, the program branches to point P, at which the processor 230 emits a synchronization signal SYN to the control means 237 which opens the lock 3 with an opening signal OS at block 122.

When the processor 230 has identified that there is no identity established between the first transmission mark $SM_x$ and the first reference mark $(BM_i)_x$ at the block 120, it checks whether a reference mark $(BM_i)_{x+p}$ is identical to the desynchronized transmission mark $SM_x$ within a capture sequence FF of m successive reference marks at the beginning of the resynchronization region NB to generate successive reference marks $(BM_i)_{x+p}$ according to the algorithm of FIG. 3, a loop A in FIG. 4 is traversed until either a reference mark $(BM_i)x$ identical to the transmission mark $SM_x$ is found, or until the loop A is traversed m times, this being equivalent to the end of the capture sequence.

When no identical reference mark has been found within the capture sequence of loop A and when a second transmission mark $SM_{x+1}$ is already present as determined at block 124, a reference mark identical to $SM_x$ is sought in that portion of a re-synchronization region NB which follows the capture region FB. To this end, the index of m is incremented by 1 at block 126 and the reference marks $(BM_i)_{x+p}$ of FIG. 3 are subsequently generated in a loop similar to the loop A and identified as loop B in FIG. 4. This loop B is departed as soon as a reference mark $(BM_i)_{x+p}$ identical to $SM_x$ has been found or when the end of the re-synchronization region has been reached after y passes.

When a reference mark $(BM_i)_{x+p+1}$ identical to $SM_{x+1}$ has been found within the re-synchronization region, then the processor initiates the generation of the following reference mark $(BM_i)_{x+p+1}$ at block 128 according to the algorithm of FIG. 3 and checks whether this reference mark is identical to the transmission mark SMx+1 at block 130. When this is the case, the re-synchronization has succeeded and the steps for opening the lock already set forth in conjunction with the block 122 and beginning at point P are carried out.

When, by contrast, no reference mark identical to $SM_x$ or to $SM_{x+1}$ has been found within the re-synchronization region, the re-synchronization has failed. In this case, the old value $(BM_o)_{x+1}$ of the reference mark loaded into the old value memory unit 234 upon receipt of the first transmission mark $SM_x$ is loaded into the reference generator 233 at block 132, so that the identity comparison starts from the old value $(BM_o)_{x-1}$ upon receipt of new transmission marks, for example, from the authorized appertaining transmitter 1. Moreover, the processor 230 emits a set signal SW to the time generator unit 236 which emits an acknowledgement signal QW at block 134 after the expiration of a programmed predetermined waiting time. Only after the waiting time is the receiver 2 again ready to receive. In the time intervening between the failed resynchronization and the output of the acknowledgement signal QW, the receiver 2 is inhibited so that no in-coming transmission marks SM are processed.

In a preferred embodiment, the processor unit 230, the random generator 2301, the memory units 232 through 235, and the control means 237 are combined in a single functional unit such as in a single-chip microprocessor 23 having mask programmable ROM.

The present invention, thus, provides a high security electronic lock system for use, for example, in an automobile or other motor vehicle.

Although other modifications and changes may be suggested by those skilled in the art, it is the intention of the inventors to embody within the patent warranted hereon all changes and modifications as reasonably and properly come within the scope of their contribution to the art.

We claim:

1. An electronic locking system including a lock comprising:

a transmitter having:

means for emitting a transmission signal modulated with a transmission mark at every transmission event, a mark generator connected preceding said emitting means and operable to provide said transmission mark form a sequence of transmission marks for modulating every transmission signal emitted by said emitting means;

a receiver having:

means for receiving said transmission signal, said receiving means having a reference generator for supplying a reference mark from a sequence of reference marks that is identical to said sequence of transmission marks of said mark generator, said reference generator being driven to a new reference mark of said sequence of reference marks by said every transmission signal received by said receiver, a synchronizing unit connected to said receiving means and said reference generator to compare said transmission mark of said transmission signal received by said receiver to said reference mark supplied by said reference generator, said synchronizing unit restoring synchronization between said receiver and said transmitter when said transmission mark and said reference mark lie within a re-synchronization region which extends over an excerpt from said sequence of reference marks, said synchronization unit having:

a mark memory in which a transmission sequence is stored, said transmission sequence being said transmission marks for a predetermined number of successive transmission signals, said synchronization unit being operable to synchronize said reference generator to a reference mark which is identical to an nth transmission mark of said transmission sequence when a reference sequence of n reference marks which is identical to said transmission sequence is present in said re-synchronization region; and a control unit connected to open the lock upon said reference mark supplied by said reference generator being identical to said transmission mark of said transmission signal received by said receiver.

2. An electronic locking system as claimed in claim 1, wherein said synchronization unit is operable to re-synchronize said reference generator to a reference mark identical to said received transmission mark upon lack of synchronization when said transmission mark is present within a capture sequence of reference marks which extends over only a beginning portion of said re-synchronization region.

3. An electronic locking system as claimed in claim 2, further comprising:

means in said receiver for setting a length of said capture sequence.

4. An electronic locking system as claimed in claim 1, further comprising:

means in said receiver for setting a length of said reference sequence.

5. An electronic locking system as claimed in claim 1, further comprising:

means in said receiver for setting a length of said re-synchronization region.

6. An electronic locking system as claimed in claim 1, further comprising:

a timer connected to said synchronization unit in said receiver and being driven by said synchronization unit to inhibit said receiver during a waiting time during which no resynchronization is possible within the resynchronization region.

7. An electronic locking system as claimed in claim 6, further comprising:

an old value memory unit connected to said reference generator and into which a most recent old value of said reference mark is deposited; and said synchronization unit setting said reference generator to said most recent old value after a failed re-synchronization.

8. An electronic locking system as claimed in claim 1, further comprising:

a trigger in said transmitting which emits a trigger signal upon actuation;

said mark generator being connected to said trigger and generating a transmission mark according to a prescribed algorithm upon receipt of said trigger signal;

a modulator connected to receive said transmission mark from said mark generator which modulates a selection signal with said transmission mark; and said emitting means being an emitter connected to an output of said modulator, said emitter being driven by said modulated selection signal from said modulator so that a transmission signal which is modulated with a transmission mark is output at every transmission event.

9. An electronic locking system as claimed in claim 1, further comprising:

said receiving means being a sensor for picking up a transmission signal from said transmitter a reference generator which supplies a reference mark from a sequence of reference marks which is identical to a sequence of transmission marks from said transmitter and which is drive to a new reference mark of said sequence of reference marks by each and every received transmission signal;

a synchronization unit which compares said transmission mark to said reference mark being supplied by said reference generator following receipt of every transmission signal, said synchronization unit restoring synchronization of said receiver to said transmitter when said transmission mark and said reference mark lie within a re-synchronization region which extends over an excerpt from said sequence of reference marks given lack of identity; and control unit connected to open said lock upon identity of said transmission mark and said reference mark when said receiver is synchronized with said transmitter.

10. A method for re-synchronizing a receiver and a transmitter of an electronic locking system having at least one lock, comprising the steps of:

emitting a transmission signal from said transmitter at every transmission event, said transmission signal being modulated with a transmission mark from a sequence of transmission marks;

storing a transmission sequence which is composed of the transmission marks of m successive transmission signals in said receiver;

setting a new value of a reference mark from a sequence of reference marks in said receiver which is identical to said sequence of said transmission marks at every transmission signal;

comparing every current transmission mark to said new value of said reference mark in said receiver;

opening said lock upon establishing identity of said transmission mark and said new value of said reference mark; and re-synchronizing said transmitter and said receiver when a reference mark which is identical to a current transmission mark lies within a re-synchronization region which extends over a excerpt from said sequence of reference marks upon lack of identity between said transmission mark and said reference mark, said re-synchronization being carried out when a reference signal composed of n reference marks which is identical to the transmission sequence is present within the re-synchronization region.

* * * * *

UNITED STATES PATENT AND TRADEMARK OFFICE
CERTIFICATE OF CORRECTION

PATENT NO. : 4,825,210

DATED : April 25, 1989

INVENTOR(S) : Anton Bachhuber and Arnost Proske

It is certified that error appears in the above—identified patent and that said Letters Patent is hereby corrected as shown below:

On the title page, item [73]:

Correct the Assignee information to read --Siemens Aktiengesellschaft, Berlin and Munich, Fed. Rep. of Germany and Bayerische Motorenwerke Aktiengesellschaft, Munich, Fed. Rep. of Germany--.

Signed and Sealed this

Tenth Day of July, 1990

*Attest:*

HARRY F. MANBECK, JR.

*Attesting Officer*

*Commissioner of Patents and Trademarks*